United States Patent Office 3,824,272
Patented July 16, 1974

3,824,272
INTERMEDIATES FOR THE PREPARATION OF ALKYL SUBSTITUTED RESORCINOLS
Arnold Brossi, Verona, and Antonino Focella and Sidney Teitel, Clifton, N.J., assignors to Hoffmann-La Roche Inc., Nutley, N.J.
No Drawing. Original application Jan. 22, 1969, Ser. No. 793,191, now abandoned. Divided and this application Sept. 16, 1971, Ser. No. 181,258
Int. Cl. C07c *61/36, 69/71*
U.S. Cl. 260—468 J        6 Claims

ABSTRACT OF THE DISCLOSURE

Preparation of 5-alkyl substituted resorcinols such as olivetol from aliphatic aldehydes and intermediates in this process.

---

This is a division of application Ser. No. 793,191, filed Jan. 22, 1969, now abandoned.

BACKGROUND OF THE INVENTION

In the past, olivetol [5-n-amyl-resorcinol] and other 5-alkyl substituted resorcinols have been synthesized from starting materials such as 3,5-dihydroxybenzoic acid. These procedures have proven extremely disadvantageous due to the fact that the starting materials are not readily available. Consequently, these processes have proven extremely costly. Therefore, it has long been desired to provide a simple and economic process for producing 5-alkyl substituted resorcinols from inexpensive starting materials.

SUMMARY OF THE INVENTION

In accordance with this invention, it has been found that 5-alkyl resorcinols of the formula:

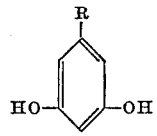

wherein R is an alkyl group containing from 1 to 26 carbon atoms, can be synthesized economically and in high yields through the condensation product of acetone and an aldehyde of the formula:

R—CHO        II wherein R is as above. In this manner, resorcinols of the formula I above, such as olivetol, can be economically prepared from cheap and readily available starting materials.

DETAILED DESCRIPTION

The term "lower alkyl" as used herein denotes both straight and branched chain alkyl groups containing from 1 to 7 carbon atoms such as methyl, ethyl, propyl, isopropyl, etc. The term "lower alkanoic acid" denotes lower alkanoic acids having from 1 to 7 carbon atoms such as formic acid, acetic acid, propionic acid, etc. The term "lower alkanol" denotes alkanols containing from 1 to 7 carbon atoms such as methanol, ethanol, propanol, isopropanol, etc. The term "phenyl-lower alkyl" as used throughout the specification denotes phenyl-lower alkyl groups containing from 7 to 14 carbon atoms such as benzyl, phenethyl, phenpropyl, etc.

The term "alkyl group containing from 1 to 26 carbon atoms," in formula I above includes both straight and branched chain alkyl groups containing from 1 to 26 carbon atoms such as methyl, ethyl, n-propyl, isopropyl, n-decyl, dodecyl, n-pentadecyl, octadecyl, heneicosyl, 1,2,3-trimethylheptyl, 1,2-dimethyloctyl, etc. In accordance with an embodiment of this invention, the process of this invention is directed to producing resorcinols of the formula I above wherein R is an alkyl group containing from 3 to 15 carbon atoms, and preferably from 5 to 15 carbon atoms.

In accordance with the first step of this reaction, an aldehyde of the formula II is condensed with acetone to produce a compound of the formula:

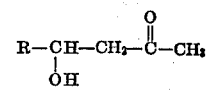

wherein R is as above. This condensation reaction is carried out by reacting a compound of the formula II with acetone in the presence of an alkali metal hydroxide such as sodium hydroxide, potassium hydroxide, etc. In carrying out this reaction, excess acetone can be utilized as the reaction medium. However, if desired, an inert organic solvent can be utilized as the reaction medium. If desired, any conventional inert organic solvent can be used as the reaction medium. Among the conventional inert organic solvents which can be utilized, toluene, benzene, xylene, dioxane, ethyl ether and tetrahydrofuran are preferred. This reaction can be carried out at room temperature. However, if desired, elevated or reduced temperatures, i.e., temperatures between 10° C. to 70° C. can be utilized.

The next step of the process of this invention is carried out by dehydrating the compound of formula III above to form a compound of the formula:

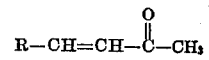

wherein R is as above.

Any conventional method of dehydrating the compound of the formula III above can be utilized in carrying out this reaction. Among the conventional dehydrating methods which can be utilized are included treating the compound of the formula III above with a dehydrating agent such as sodium sulfate, cupric sulfate, etc. This dehydration reaction can be carried out in an anhydrous solvent medium utilizing reflux temperatures. Another means for dehydrating the compound of the formula III above is by refluxing the compound of the formula III in an azeotroping agent such as a conventional azeotropic solvent. Among the azeotropic solvents which are utilized to dehydrate the compound of the formula III above, benzene, xylene, toluene, etc., are preferred.

In the next step, the compound of formula IV is converted to a compound of formula:

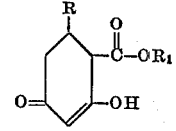

wherein R is as above, and R₁ is lower alkyl or phenyl-lower alkyl by reacting the compound of formula IV with a malonic acid ester of the formula:

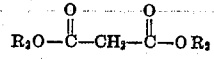

wherein R₂ is a lower alkyl or phenyl-lower alkyl. This reaction is carried out in an organic solvent in the presence of a base. Any conventional base can be utilized in carrying out this reaction. Among the conventional bases which can be utilized in accordance with this invention are included alkali metal hydroxides, such as sodium or potassium hydroxide, alkali metal amides such as sodamide, etc.; alkali metal alcoholates; alkali metal hydrides such as sodium hydride, potassium hydride, etc.; basic amines such as pyridine, etc. The preferred bases are alkali metal alkoxides such as sodium methoxide and potassium methoxide.

In this reaction between compounds of the formula VI above with compounds of the formula IV above, any conventional organic solvent can be utilized. Among the conventional solvents, the lower alkanols such as methanol, ethanol, etc., are preferred. Where a lower alkanol containing less carbon atoms than $R_2$ in the compound VI above is utilized as the organic solvent, this alkanol forms the ester group $$-\overset{\overset{O}{\|}}{C}-OR_1$$

in compounds of the formula V.

The reaction of compounds of the formula IV above with compounds of the formula VI above to produce the compound of the formula V above can be carried out by reacting one mole of the compound of the formula IV above with one mole of the compound of the formula VI above. In this reaction, a molar excess of either the compound of formula VI above or the compound of the formula IV above can be present. Furthermore, it is generally preferable that the base be present in the reaction medium in an amount of at least one mole per mole of the compound of formula IV above. However, if desired, the base can be present in excess of this amount. In carrying out this reaction, temperature and pressure are not critical, and this reaction can be carried out at room temperature and atmospheric pressure. If desired, elevated or reduced temperatures can be utilized. Generally, this reaction can be conveniently carried out at a temperature of from 0° C. to 100° C. depending upon the reflux temperature of the solvent.

In accordance with this invention, the compound of the formula V above can be converted into the compound of the formula I above by the following reaction scheme:

sequence, step (a), the compound of the formula V above is converted to the compound of the formula VII above. The reaction of step (a) is carried out by treating the compound of the formula V above with a halogenating agent wherein the halogen is bromine, chlorine or iodine. Any conventional halogenating agent can be utilized in carrying out the reaction of step (a). Among the conventional halogenating agents which can be utilized are included, N-bromo-succinimide, alkali metal hypohalites, cupric bromide, cupric iodide or cupric chloride, or a halogen such as bromine, chlorine or iodine. Generally, this reaction is carried out in an inert solvent. Any conventional inert solvent can be utilized in carrying out this reaction. Among the conventional inert solvents which can be utilized in carrying out this reaction, water, acetone, ethanol and the organic acids such as acetic acid, propionic acid, etc., are preferred. Among the organic acid solvents, the lower alkanoic acids such as acetic acid are preferred. It is generally preferable to utilize water or aqueous organic acids which include lower alkanoic acids such as aqueous acetic acid in carrying out this reaction. When a halogen such as bromine, chlorine, or iodine is utilized, this halogen is generally added to the reaction mixture dissolved in the inert organic solvent.

In carrying out the reaction of step (a), it is preferable to add about 1 mole of the halogenating agent per mole of the compound of formula V above. If desired, a molar excess of the halogenating agent can be utilized in the reaction, i.e., from about 1 to 3.5 moles of the halogenating agent per mole of the compound of formula V above. If desired, this reaction can be carried out at room temperature. However, any temperature from about 0° C. to about 30° C. can be utilized in carrying out this reaction.

The conversion of compounds of the formula VII above

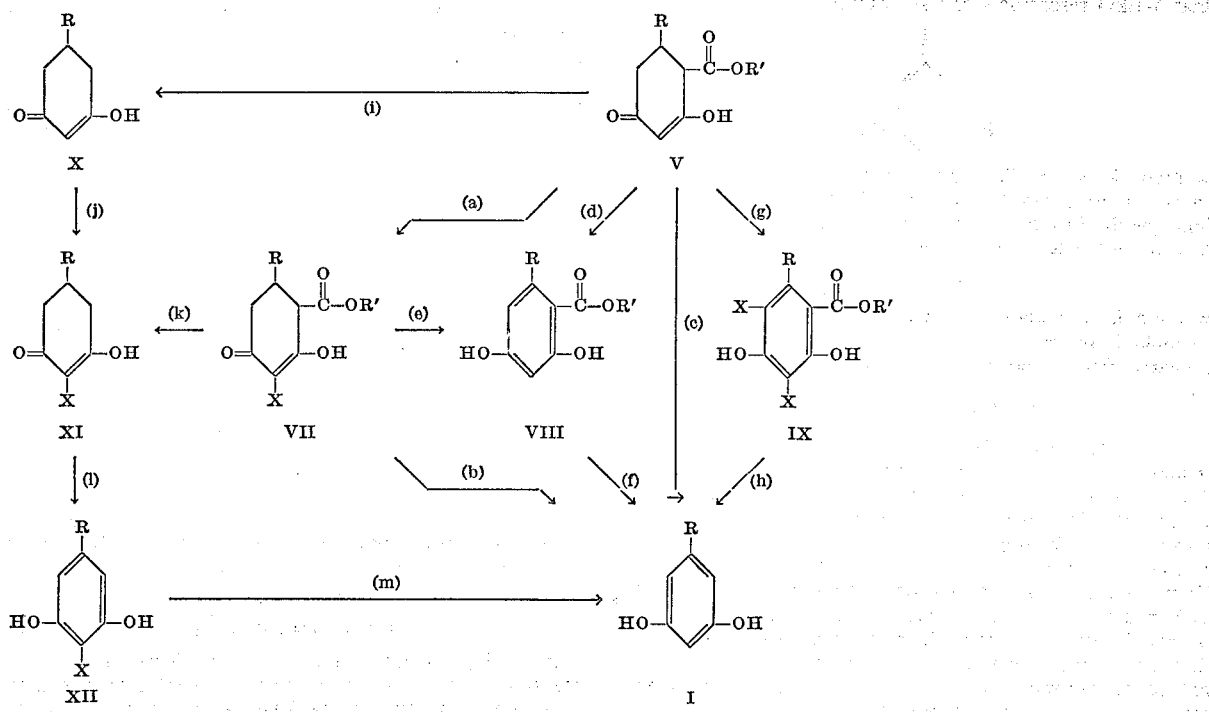

wherein R and R' are as above, and X is selected from the group consisting of chlorine, bromine or iodine.

In accordance with one embodiment of this invention, the compound of the formula V above is converted to the compound of the formula I above, via the compound of the formula VII above. In the first step of this reaction to compounds of the formula I above, is carried out by heating the compound of the formula VII above to a temperature of from 40° C. to 130° C. It is generally preferred to carry out the reaction in the presence of inorganic acid or acid salt of organic bases. The presence of these acid or acid salts speeds up the reaction. Typical inorganic acids which may be employed in the above process include hydrohalic acids (especially hydrochloric or hydrobromic acid) and sulfuric acid, as well as the mineral acid salts of organic bases such as pyridine, with pyridine hydrochloride being preferred. This reaction can be carried out in an aqueous or organic solvent medium. Any conventional inert organic solvent can be utilized as the reaction medium. On the other hand, the reaction of step (b) can take place without the use of any solvent such as by heating the compound of formula VII above to a temperature of from 40° to 120° F. This reaction of step (b) can take place at atmospheric pressure. However, if desired, elevated pressures can be utilized, i.e., from 50 p.s.i.g. to 1,000 p.s.i.g.

In accordance with another embodiment of this invention, the compound of the formula V above can be directly converted to the compound of the formula I above by treating the compound of the formula V above with a halogenating agent in an inert solvent medium, at a temperature of from 40° C. to 130° C. Any of the conventional halogenating agents such as those mentioned hereinbefore can be utilized in carrying out the reaction of step (c). The halogen should be either chlorine, bromine or iodine. Among the preferred halogenating agents are included cupric halides, such as cupric bromide, cupric chloride, cupric iodide, bromine, chlorine and iodine. In carrying out the reaction of step (c), any conventional inert solvent can be utilized. Generally, the preferred solvents are water and the organic acids which include lower alkanoic acids such as acetic acid, propionic acid, etc., or high boiling inert organic solvents such as xylene, etc. The reaction of step (c) is preferably carried out at the reflux temperature of the reaction medium. However, temperatures of from about 40° C. to about 130° C. can be utilized, depending upon the reflux temperature of the solvent medium. While reaction temperatures of from 40° C. to 130° C. can be utilized to complete the reaction, the addition of the halogenating agent to the compound of formula V above should take place at lower temperatures, i.e., from about 0° to 20° C.

In accordance with another embodiment of this invention, the compounds of formula V above can be converted to the compound of formula I above via the compound of the formula VIII above. In this reaction sequence, the compound of the formula V above is first converted to the compound of the formula VIII above via reaction step (d). The reaction of step (d) is carried out by treating the compound of the formula V above with a dehydrogenating agent. In carrying out this reaction, any conventional dehydrogenating agent can be utilized. Among the conventional dehydrogenating agents which can be utilized, dichlorodicyanoquinone, mercuric acetate and palladium on carbon are preferred. Generally, this reaction is carried out in a conventional inert organic solvent. Any conventional inert organic solvent can be utilized. Among the conventional inert organic solvents that can be utilized in this reaction, benzene, toluene, xylene, organic acids which include lower alaknoic acids such as acetic acid are preferred. When palladium on carbon is utilized as the dehydrogenating agent, no solvent need be present and the reaction can be carried out by heating the compound to a temperature of from about 150° C. to about 300° C. When a solvent is utilized, the reaction proceeds very slowly at room temperature. Therefore, it is generally preferred to utilize elevated temperatures in carrying out this reaction. In general, temperatures from about 50° C. to 120° C. are preferred depending upon the reflux temperature of the solvent utilized in the reaction medium.

The compound of formula VIII above can, if desired, be prepared from the compound of formula VII above via reaction step (e). This reaction is carried out by treating the compound of the formula VII above with organic amine base. Any conventional organic amine base such as the bases hereinbefore mentioned can be utilized. Among the conventional bases which can be utilized, pyridine, triethanolamine, etc., are preferred. In carrying out the reaction of step (e), an inert organic solvent medium can be utilized. Any conventional inert organic solvent can utilized in carrying out this reaction. Among the conventional inert organic solvents, solvents such as benzene, tetralin, decalin, xylene and 1,2,4-trichlorobenzene are preferred. This reaction is preferably carried out at temperatures of from about 40° C. to 150° C., depending upon the reflux temperature of the reaction medium. However, this reaction can be easily carried out at room temperature, i.e., temperatures of from 20° C. to 35° C.

The compound of formula VIII above is converted to the compound of formula I above via reaction step (f). The reaction step (f) is carried out by first saponifying the compound of the formula VIII above with any conventional saponifying agent to form the compound of the formula VIII above wherein R' is hydrogen and thereafter decarboxylating the compound of the formula VIII above. In saponifying the comopund of the formula VIII, any conventional saponifying agent and method of saponification can be utilized. Among the conventional saponifying agents which can be utilized are included the inert alkali metal hydroxides such as sodium hydroxide and potassium hydroxide utilizing conventional inert organic solvents or an aqueous medium. In carrying out the saponification reaction, temperature and pressure are not critical, and this reaction can be carried out at room temperatures and atmospheric pressure. However, elevated temperatures up to the reflux temperature of the solvent can be utilized.

The decarboxylation step is carried out by treating the saponified compound of formula VIII above with an inorganic acid. Any of the conventional inorganic acids such as the hydrohalic acids can be utilized in carrying out this reaction. This reaction can be carried out in an inert organic solvent or aqeous medium. In carrying out this reaction, temperature and pressure are not critical. Therefore, this reaction can be carried out at room temperature and atmospheric pressure. However, if desired, elevated or reduced temperatures and pressures can be utilized.

In accordance with another embodiment of this invention, the compound of the formula V above can be converted to the compound of the formula I above via the compound of the formula IX above. In the first step of this reaction, the compound of the formula V above is converted to the compound of the formula IX above via reaction step (g). The reaction step (g), is carried out by treating the compound of the formula V with a halogenating agent in the presence of an organic base preferably pyridine. In carrying out the reaction of step (g), the halogen of the halogenating agent utilized should be bromine, chlorine or iodine, and at least 2 moles of the halogenating agent should be present per mole of the compound of the formula V above. Any of the halogenating agents described in connection with step (a) can by utilized in carrying out the reaction of step (g). If desired, a molar excess of the halogenating agent can be present, i.e., from about 2 to about 6 moles of the halogenating agent per mole of the compound of formula V above. The reaction of step (g) is carried out in the presence of an organic base. The organic base can be present in catalytic amounts. If desired, the organic base can be added to the reaction medium in large amounts, i.e., from about 1 mole to about 6 moles of the organic base per mole of the halogen. In carrying out this reaction, any conventional inert organic solvent can be utilized. Among the conventional inert organic solvents which can be utilized are included, dimethylformamide, benzene, toluene, etc. Generally, this reaction is carried out in an anhydrous medium. Furthermore, in carrying out this reaction, temperatures of from about −50° C. to about 20° C. and can be utilized. Generally it is preferred to carry out this reaction at a temperature of from −35° C. to about 5° C.

The compound of formula IX above is converted, via step (h), to the compound of formula I above by hydrogenating the compound of formula IX with a palladium catalyst in the presence of an alkali metal hydroxide at elevated pressures. Any conventional palladium catalyst such as palladium, palladium on carbon, etc., can be utilized in carrying out this hydrogenation reaction. In carrying out this reaction, any conventional alkali metal hydroxide such as sodium hydroxide or potassium hydroxide can be utilized. The palladium catalyst and the alkali metal hydroxide can be present in the reaction medium in catalytic quantities. However, if desired, large excess of the palladium catalyst or the alkali metal hydroxide can be utilized. Generally, this reaction is carried out in a conventional inert organic solvent. Any conventional inert organic solvent such as the solvents hereinbefore mentioned can be utilized. The reaction of step (h) is carried out under a hydrogen pressure of from about 50 p.s.i.g. to about 1,000 p.s.i.g. In this reaction temperature is not critical and room temperature can be utilized. However, if desired, elevated temperatures can be utilized in carrying out this reaction. Generally, this reaction can be carried out at a temperature of from about 20° C. to about 150° C.

In accordance with another embodiment of this invention, the compound of the formula V above is converted to the compound of the formula I via compounds of the formulae X, XI and XII. In this embodiment, the compound of the formula V above is first converted into the compound of the formula X above via reaction step (i) by saponification and decarboxylation. The saponification step converts R' into hydrogen in the compound of the formula V above and this saponified product is then decarboxylated to form the compound of formula X above. The reaction of step (i) is carried out utilizing the same conditions described in connection with reaction step (f).

The compound of formula X above can be converted into the compound of the formula XI above via reaction step (j) by treating the compound of the formula X above with a halogenating agent in the manner described in connection with step (a).

The preferred method of halogenation is to treat the compound of formula X with an alkali metal hypohalite in an aqueous medium in the presence of an alkali metal hydroxide.

In accordance with another embodiment of this invention, the compound of the formula XI above can be prepared from a compound of the formula VII above via reaction step (k). Reaction step (k) is carried out by first saponifying the compound of the formula VII so that R' in the compound of the formula VII is hydrogen. This saponified product is then decarboxylated to form a compound of the formula XI above. The saponification and decarboxylation in reaction step (k) is carried out utilizing the same conditions and in the same manner described in connection with reaction step (f). The decarboxylation in step (k) is generally carried out at temperatures of from 0° to 30° C.

The compound of formula XI is converted to the compound of formula XII by treating the compound of formula XI with a dehydrogenating agent as described in connection with reaction step (d). The same conditions utilized in connection with reaction step (d) are utilized in connection with reaction step (1). The preferred dehydrogenating agent for use in carrying out reaction step (1) is mercuric acetate in an organic acid solvent such as acetic acid.

The compound of the formula XII above is converted into the compound of the formula I above via reaction step (m) by hydrogenating the compound of the formula XII above with a palladium catalyst under elevated pressure. The same conditions described in connection with reaction step (h) are utilized in carrying out the reaction of step (m).

In connection with another embodiment of this invention, the compound of the formula X above can be converted into the compound of the formula I above by means of the following reaction scheme:

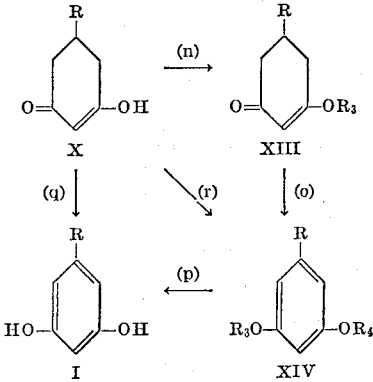

wherein $R_3$ and $R_4$ is lower alkyl or phenyl-lower alkyl and R is as above.

In accordance with this embodiment, the compound of formula X is converted to the compound of the formula I above via compounds of the formulae XIII and XIV. The compound of formula X above can be converted to the compound of formula XIII above by any conventional means of etherification. Among the methods of etherification which can be utilized to form the compound of formula XIII is to treat the compound of formula X with a lower alkanol such as methanol, ethanol, etc., or phenyl-lower alkanol in the presence of a mineral acid such as hydrogen bromide, hydrogen chloride, etc. This reaction can be carried out, if desired, in an inert organic solvent medium. On the other hand, the lower alkanol or the phenyl-lower alkanol itself can be utilized as the solvent medium. In this reaction, temperature and pressure are not critical, and this reaction can be carried out at room temperature and atmospheric pressure or at elevated temperatures and pressures.

In accordance with this invention, either the compound of formula XIII above or the compound of formula X above can be converted to the compound of formula XIV above by treating either the compound of formula X or the compound of formula XIII above with cupric halide such as cupric chloride, cupric bromide, etc., in the presence of a lower alkanol or phenyl-lower alkanol. This reaction can be carried out, if desired, in a conventional inert organic solvent. On the other hand, the lower alkanol can be utilized as the solvent medium. In carrying out the reaction of either step (o) or step (r), temperature and pressure are not critical, and these reactions can take place at room temperature and atmospheric pressure. On the other hand, elevated temperatures and pressures can be utilized if desired.

In accordance with a preferred embodiment of this invention the process of step (o) above can produce a new compound of the formula:

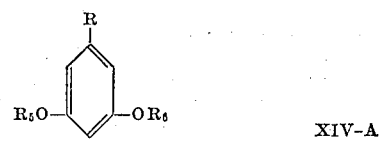

XIV-A wherein R is as above, $R_5$ and $R_6$ are independently selected from phenyl-lower alkyl or lower alkyl with the proviso that the ether formed by $R_5$ is a different ether from the ether formed by $R_6$. The compound of formula XIV-A can be formed from the compound of formula XIII above by etherification via step (o). In forming the compound of the formula XIV-A by step (o) a different alkanol or phenyl-lower alkanol is utilized than the alkanol or phenyl-lower alkanol utilized in forming $R_3$ in step (n). In this manner a diether of formula XIV-A is formed wherein the ether groups are not identical. Thus, the compound of formula XIV-A covers such compounds as:

3-ethoxy-5-methoxy-n-amylbenzene
3-isopropoxy-5-methoxy-n-pentylbenzene.

The compound of the formula XIV above is converted into the compound of the formula I above by any conventional method of ether hydrolysis. Among the conventional methods of ether hydrolysis that can be utilized in carrying out reaction step (p), it is generally preferred to treat the compound of the formula XIV with a mineral acid and salts of organic amine bases, such as those mentioned hereinbefore. Among the preferred are included, hydrobromic acid, and pyridine hydrochloride. Generally, this reaction is carried out in the presence of an inert organic solvent. Any conventional inert organic solvent such as the solvents mentioned hereinbefore can be utilized. In carrying out this reaction, temperature and pressure are not critical, and this reaction can be carried out at room temperature and atmospheric pressure. However, if desired, elevated temperatures and pressures can be utilized.

In accordance with another embodiment of this invention, the compound of the formula X above can be directly converted to the compound of the formula I above as in reaction step (q). This reaction is carried out by treating the compound of the formula X above with a dehydrogenating agent. The same conditions described in connection with reaction step (d) can be utilized in carrying out the reaction of step (q). Among the preferred dehydrogenating agents which can be utilized in carrying out reaction step (q), mercuric acetate is preferred. The preferred solvent in this reaction is an organic acid solvent such as acetic acid.

The process of this invention can be utilized in preparing a variety of resorcinols. By means of the process of this invention, the following aldehydes can be converted to the following resorcinols via the following 2-hydroxy-4-oxo-cyclohex-2-ene-1-carboxylates of formula V above:

hexanal to 5-(n-pentyl)-resorcinol via methyl-6-n-pentyl-2-hydroxy-4-oxo-cyclohex-2-ene-1-carboxylate;
butanal to 5-(n-propyl)-resorcinol via methyl-6-n-propyl-2-hydroxy-4-oxo-cyclohex-2-ene-1-carboxylate;
octanal to 5-n-heptyl-resorcinol via methyl-6-n-heptyl-2-hydroxy-4-oxo-cyclohex-2-ene-1-carboxylate;
2-methyloctanal to 5(1-methylheptyl)-resorcinol via methyl-2-hydroxy-4-oxo-6-(1-methylheptyl)-2-cyclohexene-1-carboxylate;
hendecanal to 5-(n-decyl)-resorcinol via methyl-2-hydroxy-4-oxo-6-(n-decyl)-2-cyclohexene-1-carboxylate;
hexadecanal to 5-(n-pentadecyl)-resorcinol via methyl-2-hydroxy-4-oxo-6-(1-pentadecyl)-2-cyclohexene-1-carboxylate;
docosanal to 5-heneicosyl resorcinol via methyl-2-hydroxy-4-oxo-6-(heneicosyl)-2-cyclohexene-1-carboxylate; and
hexacosanal to 5-pentacosyl resorcinol via methyl-2-hydroxy-4-oxo-6-(pentacosyl)-2-cyclohexene-1-carboxylate.

The resorcinols produced in accordance with the process of this invention have a variety of uses. 5-n-pentyl resorcinol (Olivetol) is an important intermediate in the preparation of tetrahydrocannabinols (the active constituent of marijuana). Furthermore, alkyl resorcinols such as n-propyl resorcinol, n-butyl resorcinol, n-hexyl resorcinol, n-heptyl resorcinol, n-decyl resorcinol, etc., are well known bactericides. Furthermore, higher alkyl resorcinols such as 5-n-henecosyl-resorcinol and 5-nonadecyl resorcinol are food additives which are found naturally in wheat bran. Therefore, the process of this invention provides a simple and economic means for synthesizing valuable resorcinols.

The invention will be more fully understood from the specific examples which follow. These examples are intended to illustrate the invention, and are not to be construed as limitative thereof. The temperatures of these examples are in degrees Centigrade, and the ether utilized in these examples is diethyl ether.

Example 1

Into a 2-liter three neck flask fitted with a reflux condenser topped with a $N_2$ gas inlet tube attached to a constant pressure mercury gauge, mechanical stirrer, dropping funnel and thermometer were placed 230 ml. of anhydrous methanol (reagent grade) and 32.4 g. (0.60 mole) of sodium methoxide. A slow current of $N_2$ gas was introduced and the mixture was stirred until a complete solution was obtained. One hundred and ten grams (0.68 mole) of diethyl malonate was added, the solution was stirred for an additional 10 minutes and 75 g. (0.48 mole) of 90% pure 3-nonene-2-one was added portionwise at a rate such that the reaction temperature was kept below the boiling point (ca. 50–60°). Stirring and refluxing were continued for 3 hours. The reaction mixture was allowed to cool to room temperature, neutralized with concentrated HCl (~50 ml.) and allowed to stand overnight. The solvent was distilled under reduced pressure and the residue was partitioned between 200 ml. of 1 N HCl and 800 ml. of ethyl acetate. The aqueous layer was separated and the organic phase was washed with two 300 ml. portions of water and the product was then extracted from the ethyl acetate with a saturated solution of sodium bicarbonate until a small portion on acidification no longer gave a turbid solution (≃five 200 ml. portions). The sodium bicarbonate solution was cautiously acidified and extracted with three 300 ml. portions of ether. The ether solution was dried over sodium sulfate and distilled under reduced pressure. The semi-solid residue was dried at 50° under high vacuum for 5 hours to yield methyl 6-n-pentyl-2-hydroxy-4-oxo-cyclohex-2-ene-1-carboxylate as a white solid, m.p. 83–85°.

Example 2

Into a 2-liter three neck flask fitted with a reflux condenser, mechanical stirrer, dropping funnel and thermometer were placed 60 g. (0.25 mole) of methyl 6-n-pentyl-2-hydroxy-4-oxo-cyclohex-2-ene-1-carboxylate, 200 ml. of acetic acid and 200 ml. of water. The mixture was stirred vigorously until a fine suspension was obtained, cooled and maintained at 5–10° while 44.4 g. (0.28 mole) of bromine, dissolved in 70 ml. of acetic acid, was added dropwise over a period of 2 hours. The reaction was stirred at room temperature for 1 hour and then diluted with 500 ml. of water and allowed to stand at 5–10° overnight. The solids were filtered, washed with cold water (ca. three 75 ml. portions) until the washings gave a negative test for bromine and dried in a vacuum oven at 50° for 4 hours to give methyl 3-bromo-2-hydroxy-4-oxo-6-n-pentyl-cyclohex-2-ene-1-carboxylate, m.p. 100–102°.

Example 3

Into a 500 ml. three neck flask fitted with a reflux condenser, mechanical stirrer and thermometer were placed 60 g. (0.182 mole) of methyl 3-bromo-2-hydroxy-4-oxo-6-n-pentyl-cyclohex-2-ene-1-carboxylate and 90 g. (0.75 mole) of anhydrous pyridine hydrochloride. The semi-solid mixture was heated in an oil bath at 90° for 4 hours (internal temperature 82–84°) and then at 200° for 2 hours. The reaction mixture was cooled to room temperature and partitioned between 550 ml. of ether and 100 ml. of 1.2 N HCl. The aqueous layer was separated and the ether phase washed with 50 ml. of 1.2 N HCl and then with 75 ml. of water. The organic phase was then washed with two 75 ml. portions of 10% sodium hydrosulfite (dithionite) followed by two 75 ml. portions of saturated $NaHCO_3$ and then with 75 ml. of water, dried over anhydrous $Na_2SO_4$ and the solvent evaporated under reduced pressure. The dark oil (34.6 g.) was distilled at 125–130°/0.05 mm. Hg to yield Olivetol.

Example 4

30 g. (0.25 mole) of 92.4% pure 3-hepten-2-one and 52 g. (0.32 mole) of diethyl malonate were reacted in the manner of Example 1 to produce methyl 2-hydroxy-4-oxo-6-n-propyl-2-cyclohexene-1-carboxylate as a white solid, m.p. 95–98°.

Example 5

3 g. (0.014 mole) of methyl 2 - hydroxy-4-oxo-6-n-propyl-2-cyclohexene-1-carboxylate was reacted in the manner of Example 2 with 2.3 g. (0.014 mole) of bromine to produce, after crystallization from ethyl acetate, methyl 3 - bromo-2-hydroxy-4-oxo-6-n-propyl-2-cyclohexene-1-carboxylate.

Example 6

6 g. (0.021 mole) of methyl 3-bromo-2-hydroxy-4-oxo-6-n-propyl-2-cyclohexene-1-carboxylate was reacted in the manner of Example 3 with 9 g. (0.105 mole) of anhydrous pyridine HCl to give 5-n-propylresorcinol as a brown oil which was crystallized from water and melted at 48–50°.

Example 7

192 g. (0.97 mole) of 85% pure 3-undecene-2-one was reacted in the manner of Example 1 with 262 g. (1.65 moles) of diethyl malonate to give methyl-2-hydroxy-4-oxo - 6 - n-heptyl-2-cyclohexene-1-carboxylate as a white solid, m.p. 75–78°.

Example 8

268 g. (1 mole) of methyl 2-hydroxy-4-oxo-6-n-heptyl-2-cyclohexene-1-carboxylate was reacted in the manner of Example 2 with 176 g. (1.1 moles) of bromine to give methyl 3-bromo - 2 - hydroxy-4-oxo-6-n-heptyl-2-cyclohexene-1-carboxylate as a white solid melting at 84–87°.

Example 9

Into a 3-liter three neck flask fitted with a reflux condenser with a Dean-Stark attachment, mechanical stirrer and thermometer were placed 348 g. (1 mole) of methyl 3-bromo - 2 - hydroxy-4-oxo-6-n-heptyl-2-cyclohexene-1-carboxylate and 522 g. (4.6 moles) of anhydrous pyridine hydrochloride. The semi-solid mixture was heated in an oil bath at 90° for 4 hours (internal temperature 82–84°). The oil bath was replaced with a mantle and the reaction mixture was heated (volatiles removed by means of the Dean-Stark take-off) until the internal temperature reached 190–200° and maintained in this range for 2 hours. The reaction mixture was cooled to room temperature and partitioned between 3 liters of ether and 660 ml. of 1.2 N HCl. The aqueous layer was separated and the ether phase washed with 300 ml. of 1.2 N HCl and then with two 300 ml. portions of water. The ether solution was extracted with four 350 ml. portions of a 10% NaOH solution and the combined sodium hydroxide extracts were extracted with two 300 ml. portions of ether. The alkaline aqueous solution was acidified with concentrated hydrochloric acid ($\simeq$ 700 ml.) and re-extracted with three 800 ml. portions of ether. The combined ether extracts were washed with three 300 ml. portions of 10% sodium hydrosulfite followed by two 300 ml. portions of saturated $NaHCO_3$ and then with 300 ml. of water, dried over anhydrous $Na_2SO_4$ and the solvent evaporated under reduced pressure. The dark oil (172.5 g.) was distilled. The forerun boiling at 140–150°/0.03 mm. Hg (8 g.) was discarded and the fraction boiling at 150–155°/0.02 mm. Hg was collected to give 5-n-heptylresorcinol.

Example 10

15 g. (0.078 mole) of 96.6% pure 5-methylundec-3-en-2-one was reacted in the manner of Example 1 with 19 g. (0.12 mole) of diethyl malonate to give methyl-2-hydroxy - 4-oxo-6-(1-methylheptyl)-2-cyclohexene-1-carboxylate as a white solid, m.p. 80–86°.

Example 11

20.2 g. (0.07 mole) of methyl-2-hydroxy-4-oxo-6-(1-methylheptyl)-2-cyclohexene-1-carboxylate was reacted in the manner of Example 2 with 12 g. (0.072 mole) of bromine to produce 25.7 g. of crude methyl 3-bromo-2-hydroxy - 4 - oxo-6(1-methylheptyl)-2-cyclohexene-1-carboxylate. The crude methyl 3-bromo-2-hydroxy-4-oxo-6 (1-methylheptyl)-2-cyclohexene-1-carboxylate was treated with 32 g. (0.27 mole) of anhydrous pyridine hydrochloride by the procedure set forth in Example 3 to give 5-(1-methylheptyl)resorcinol as a colorless oil boiling at 129°/0.04 mm. Hg.

Example 12

A mixture of 5 g. (0.021 mole) of methyl 6-n-pentyl-2-hydroxy - 4 - oxo-cyclohex-2-ene-1-carboxylate, 5.5 g. (0.021 mole) of iodine and 50 ml. of acetic acid was stirred at room temperature for 24 hours. The solvent was evaporated under reduced pressure and the residue partitioned between water and ethyl acetate. The aqueous phase was separated and the ethyl acetate solution extracted with two 100 ml. portions of sodium bicarbonate. The bicarbonate solution was acidified and extracted with two 100 ml. portions of ethyl acetate. The ethyl acetate extracts were combined, washed with water, dried over anhydrous sodium sulfate and evaporated under reduced pressure to give methyl 3-iodo-2-hydroxy-4-oxo-6-n-pentyl-2-cyclohexene-1-carboxylate, m.p. 109–112°.

Example 13

A mixture of 2.4 g. (0.01 mole) of methyl 6-n-pentyl-2-hydroxy - 4-oxo-cyclohex-2-ene-1-carboxylate and 3.4 g. (0.015 mole) of dichlorodicyanoquinone in 100 ml. of benzene was stirred and refluxed for 8 hours. The reaction mixture was allowed to cool to room temperature and the precipitate filtered. The filtrate was washed with water, then with two 75 ml. portions of a 10% $Na_2CO_3$ solution and then extracted with two 75 ml. portions of a 5% NaOH solution. The sodium hydroxide solution was acidified with 6 N hydrochloric acid and extracted with two 150 ml. portions of ethyl acetate. The organic phase was washed with water, dried over anhydrous sodium sulfate and distilled under reduced pressure to give methyl 2,4-dihydroxy-6-n-pentylbenzoate as a viscous oil.

Example 14

A mixture of 2.4 g. (0.01 mole) of methyl 6-n-pentyl-2-hydroxy-4-oxo-cyclohex-2-ene-1-carboxylate and 1.5 g. of 25% Pd/C was heated at 230–240° for 3 hours. The reaction mixture was allowed to cool to room temperature, 100 ml. of benzene was added and the resulting suspension warmed on a steam bath and filtered hot. The filtrate was dried over anhydrous sodium sulfate and evaporated under reduced pressure to give 0.9 g. (38%) of methyl 2,4-dihydroxy-6-n-pentylbenzoate as a viscous oil.

Example 15

A mixture of 2.4 g. (0.01 mole) of methyl 6-n-pentyl-2-hydroxy-4-oxo-cyclohex-2-ene-1-carboxylate and 3.4 g. (0.011 mole) of mercuric acetate in 50 ml. of acetic acid was stirred and refluxed for 4 hours, cooled to room temperature and the solution decanted from the metallic mercury. The solvent was distilled under reduced pressure and the residue partitioned between 100 ml. of ethyl acetate and 50 ml. of water. The organic phase was extracted with two 100 ml. portions of sodium bicarbonate, two 50 ml. portions of 1% NaOH solution and then with 50 ml. of water, dried over anhydrous sodium sulfate and evaporated under reduced pressure. The oily residue (1.3 g.) was crystallized from ether to give methyl 2,4-dihydroxy-6-n-pentylbenzoate, M.P. 73–75°.

Example 16

A mixture of 6.4 g. (0.02 mole) of methyl 3-iodo-2-hydroxy-4-oxo-6-n-pentyl-cyclohex - 2 - ene - 1 - carboxylate and 2 g. (0.022 mole) of pyridine in 50 ml. of 1,2,4-trichlorobenzene was stirred at 95–100° (internal temperature) for 2 hours. The mixture was cooled, washed with two 25 ml. portions of 1.2 N HCl, then with two 30 ml. portions of water, followed by two 40 ml. portions of a 1:1 parts by volume mixture of saturated solution of sodium bicarbonate and sodium carbonate and then extracted with three 100 ml. portions of 5% by weight NaOH solution. The alkaline solution was acidified with 6 N HCl and extracted with three 100 ml. portions of ethyl acetate. The combined ethyl acetate extracts were washed with water, dried over anhydrous $Na_2SO_4$ and the solvent removed under reduced pressure to give methyl 2,4-dihydroxy-6-n-pentylbenzoate as a viscous oil.

Example 17

A mixture of 4.8 g. (0.02 mole) of methyl 6-n-pentyl-2-hydroxy-4-oxo-cyclohex-2-ene-1-carboxylate and 100 ml. of acetic acid was stirred vigorously at 75° until a fine suspension was obtained. The mixture was cooled and maintained at 5–10° while a solution of 3.9 g. (0.021 mole) of bromine dissolved in 10 ml. of acetic acid was added dropwise over a period of 1 hour. The reaction mixture was allowed to stir at room temperature for 1 hour and then on a steam bath for 3 hours. The solvent was evaporated under reduced pressure and the oily residue dissolved in 200 ml. of ether, washed with two 25 ml. portions of 10% sodium hydrosulfite, followed by two 25 ml. portions of saturated $NaHCO_3$ and then with water, dried over anhydrous $Na_2SO_4$ and evaporated under reduced pressure to give Olivetol.

Example 18

A mixture of 4.8 g. (0.02 mole) of methyl 6-n-pentyl-2-hydroxy-4-oxo-cyclohex-2-ene-1-carboxylate and 5.6 g. (0.021 mole) of iodine in 200 ml. of acetic acid was stirred and heated to reflux for 10 hours. The solvent was removed under reduced pressure and the oily residue was dissolved in 250 ml. of ether and washed with two 50 ml. portions of water. The ether layer was then washed with two 25 ml. portions of an aqueous solution containing 10% by weight sodium hydrosulfite, followed by two 25 ml. portions of saturated $NaHCO_3$ and then with water, dried over anhydrous $Na_2SO_4$ and the solvent evaporated under reduced pressure to give Olivetol.

Example 19

A mixture of 12.2 g. (0.05 mole) of methyl 6-n-pentyl-2-hydroxy-4-oxo-cyclohex-2-ene-1-carboxylate and 100 ml. of acetic acid was stirred vigorously at 25° until a fine suspension was obtained. It was cooled and maintained at 5–10° while 22.4 g. (0.1 mole) of cupric bromide dissolved in 25 ml. of acetic acid was added dropwise over a period of 1 hour. The reaction mixture was allowed to stir at room temperature for 1 hour and then at steam bath temperature for 3 hours. The solvent was evaporated under reduced pressure and the residue partitioned between 200 ml. of water and 300 ml. of ether. The ether extracts were washed with two 50 ml. portions of an aqueous solution containing 10% by weight sodium hydrosulfite, followed by two 35 ml. portions of saturated $NaHCO_3$ and then with 75 ml. of water, dried over anhydrous $Na_2SO_4$ and the solvent evaporated under reduced pressure to give Olivetol.

Example 20

A mixture of 52 g. (0.16 mole) of methyl 3-bromo-2-hydroxy-4-oxo-6-n-pentyl-cyclohex-2-ene-1-carboxylate and 200 ml. of concentrated hydrochloric acid in 100 ml. of acetic acid was stirred and refluxed for 14 hours. The solvent was removed under reduced pressure and the residue was dissolved in 500 ml. of ether. The organic phase was washed with 200 ml. of water, then with two 50 ml. portions of an aqueous solution containing 10% by weight of sodium hydrosulfite, followed by two 75 ml. portions of saturated $NaHCO_3$ and then with 75 ml. of water and dried over anhydrous $Na_2SO_4$. The solvent was evaporated under reduced pressure to give a dark oil (28.8 g.) which was distilled at 130–135°/0.2 mm. Hg to yield Olivetol.

Example 21

A mixture of 52 g. (0.16 mole) of methyl 3-bromo-2-hydroxy-4-oxo-6-n-pentyl-cyclohex-2-ene-1-carboxylate and 200 ml. of an aqueous solution containing 48% by weight of hydrobromic acid in 100 ml. of acetic acid was stirred and refluxed for 3 hours. The solvent was removed under reduced pressure and the residue was dissolved in 500 ml. of ether. The ether phase was washed with two 100 ml. portions of water and then with two 50 ml. portions of 10% sodium hydrosulfite, followed by two 75 ml. portions of saturated $NaHCO_3$ and then with 75 ml. of water, dried over anhydrous $Na_2SO_4$ and the solvent evaporated under reduced pressure. The dark oil (30.1 g.) distilled at 130–140°/0.2 mm. Hg to yield Olivetol.

Example 22

A mixture of 24 g. (0.1 mole) of methyl 2,4-dihydroxy-6-n-pentylbenzoate and 200 ml. of a 10% by weight NaOH solution was heated on a steam bath for 7 hours. The solution was cooled, extracted with two 100 ml. portions of ether, and slowly acidified with concentrated hydrochloric acid. The aqueous phase was heated at steam temperature for 1 hour longer, cooled and extracted with three 200 ml. portions of ether. The extracts were combined, washed with two 75 ml. portions of water, then with two 50 ml. portions of an aqueous solution containing 10% by weight of sodium hydrosulfite, followed by two 50 ml. portions of water, dried over anhydrous $Na_2SO_4$ and the solvent was removed under reduced pressure to give Olivetol.

Example 23

A solution of 50 g. (0.208 mole) of methyl 6-n-pentyl-2-hydroxy-4-oxo-cyclohex-2-ene-1-carboxylate in 200 ml. of an aqueous solution containing 20% by weight of NaOH was heated on a steam bath for 2.5 hours, cooled and extracted with two 100 ml. portions of ether. The alkaline aqueous solution was acidified slowly with about 80 ml. of concentrated hydrochloric acid. The resulting aqueous mixture was stirred and heated on a steam bath for 1 hour longer, cooled and extracted with three 200 ml. portions of ether. The ether extracts were washed with water, dried over anhydrous sodium sulfate and the solvent was evaporated under reduced pressure. The residue was treated twice with 50 ml. of benzene, distilling the solvent each time, to leave 3-hydroxy-5-n-pentyl-2-cyclohexene-1-one as a viscous oil which solidified on standing.

Example 24

A solution of 30 g. (0.094 mole) of methyl 3-bromo-2-hydroxy-4-oxo-6-n-pentyl-cyclohex-2-ene-1-carboxylate in 200 ml. of an aqueous solution containing 10% by weight of NaOH was heated on a steam bath for 2 hours. The mixture was cooled to 0–5° which was maintained while 6 N HCl was added slowly with stirring until an acidic solution was obtained. The reaction mixture was allowed to warm to room temperature and stirred overnight. The resulting semi-solid mixture was dissolved in 500 ml. of ethyl acetate, washed with three 50 ml. portions of water and extracted with three 150 ml. portions of saturated aqueous $NaHCO_3$. The stirred bicarbonate solution was acidified with dilute HCl and the mixture allowed to stand overnight. The precipitate was filtered, washed with water and dried in a vacuum oven at 50° for 4 hours to give 2-bromo-3-hydroxy-5-n-pentyl-2-cyclohexene-1-one, m.p. 135–138°.

Example 25

To a stirred solution of 18.2 g. (0.1 mole) of 3-hydroxy-5-n-pentyl-2-cyclohexene-1-one in 300 ml. of a 5% NaOH solution which was maintained at 5–10°, 45.6 ml. of a 17% by weight (0.11 mole) aqueous sodium hypochloride solution was added over 1 hour. The mixture was stirred at room temperature for 2 hours and then at 50° for 30 minutes, cooled to 4°, acidified with 6 N HCl and allowed to stir overnight. The precipitate that formed was filtered, washed with water and dried to give 2-chloro-3-hydroxy-5-n-pentyl-2-cyclohexen-1-one, m.p. 125–129°.

Example 26

A mixture of 4.3 g. (0.02 mole) of 2-chloro-3-hydroxy-5-n-pentyl-2-cyclohexen-1-one, 6.4 g. (0.02 mole) of mercuric acetate in 120 ml. of acetic acid was stirred and refluxed for 4 hours. The solution was decanted from the metallic mercury and the solvent was removed under reduced pressure. The oily residue was dissolved in 200 ml. of an aqueous solution containing 10% by weight NaOH, 10 g. of sodium hydrosulfite was added and the mixture was heated at 50° for 20 minutes with occasiondal shaking. The mixture was allowed to cool to room temperature and filtered by gravity. The filtrate was extracted with two 50 ml. portions of ether and acidified with 6 N HCl and extracted with three 75 ml. portions of ether. The combined ether extracts were washed with three 50 ml. portions of sodium bicarbonate, dried over anhydrous $Na_2SO_4$ and the solvent was removed under reduced pressure. The oily residue was purified by dry column chromatography, using silica gel as the absorbent and a mixture of 97 parts by volume benzene: 3 parts by volume ethyl acetate as the developing agent, to give 2-chloro-5-n-pentylresorcinol: b.p. >300°/760 mm. Hg.

Example 27

A stirred mixture of 24 g. (0.1 mole) of methyl 6-n-pentyl - 2 - hydroxy - 4-oxo-cyclohex-2-ene-1-carboxylate, 50 ml. of pyridine and 50 ml. of dimethylformamide was stirred and cooled at —30° and maintained at this temperature while 48 g. (0.3 mole) of bromine was added dropwise over a period of 2 hours. The reaction mixture was allowed to warm to room temperature, stirred at this temperature overnight and the volatiles were evaporated under reduced pressure. The residue was dissolved in 800 ml. of ethyl acetate, washed with three 100 ml. portions of water and then with three 250 ml. portions of a saturated $NaHCO_3$. The organic phase was extracted with three 150 ml. portions of an aqueous solution containing 5% by weight of NaOH, the alkaline aqueous solution acidified with 6 N HCl and extracted with two 400 ml. portions of ethyl acetate. The organic extract was dried over $Na_2SO_4$ and the solvent was removed under reduced pressure to give 3,5-dibromo-2,4-dihydroxy-6-n-pentylbenzoic acid methyl ester as a dark oil.

Example 28

A solution of 91 g. (0.5 mole) of 3-hydroxy-5-n-pentyl-2-cyclohexene-1-one in 300 ml. of 5% by weight of hydrogen bromide in methanol was stirred at room temperature for 24 hours. The volatiles were removed under reduced pressure and the oily residue was dissolved in 700 ml. of ether, extracted with four 150 ml. portions of a saturated aqueous $Na_2CO_3$ solution, washed with 150 ml. of water, dried over anhydrous $Na_2SO_4$ and then distilled at 109°/0.06 mm. Hg to give 3-methoxy-5-n-pentyl-2-cyclohexene-1-one.

Example 29

A mixture of 18 g. of (0.1 mole) of 3-hydroxy-5-n-pentyl-2-cyclohexene-1-one and 34.1 g. (0.2 mole) of cupric bromide in 300 ml. of methanol was stirred at room temperature for 24 hours, filtered and the filtrate evaporated under reduced pressure. The residual oil was partitioned between 300 ml. of ether and 150 ml. of water. The ether layer was separated, washed with two 150 ml. portions of saturated $Na_2CO_3$ solution, 100 ml. of water and dried over anhydrous $Na_2SO_4$ and evaporated. The dark oil was fractionally distilled to give 3,4-dimethoxy-n-amylbenzene, b.p. 110°/0.05 mm. Hg.

Example 30

A mixture of 3.6 g. (0.02 mole) of 3-methoxy-5-n-pentyl-2-cyclohexene-1-one and 6.8 g. (0.04 mole) of cupric bromide in 100 ml. of methanol was reacted by the procedure given in Example 29 to afford 3,5-dimethoxy-n-amylbenzene.

Example 31

To a solution of 36 g. (0.2 mole) of 3-hydroxy-5-n-pentyl-2-cyclohexene-1-one in 500 ml. of acetic acid, 77 g. (0.241 mole) of mercuric acetate was added and the mixture was stirred and refluxed for 7 hours. After standing overnight, the solution was decanted from the metallic mercury that had formed and the solvent was evaporated under reduced pressure. The dark brown oily residue was dissolved in 400 ml. of an aqueous solution containing 10% by weight of NaOH, 20 g. of sodium hydrosulfide was added and the mixture was heated on a steam bath for 30 minutes. Charcoal (3 g.) was then added, the mixture was heated for an additional 10 minutes, filtered by gravity and the cake was washed with an aqueous solution containing 10% by weight NaOH solution. The combined filtrations were neutralized to pH 6.5–7 with concentrated hydrochloric acid and extracted with three 250 ml. portions of ether. The ether extracts were washed with two 70 ml. portions of a saturated solution of sodium sulfite, two 75 ml. portions of a 1 part by volume to 1 part by volume mixture of saturated solutions of $Na_2CO_3$ and $NaHCO_3$, water, dried over anhydrous $Na_2SO_4$, and then the solvent was evaporated under reduced pressure. The dark oil (31 g.) was distilled using a small fractionating column. The first fraction (2.4 g.) boiling at 105–120°/0.1 mm. Hg was discarded and the fraction boiling at 120–130°/0.04 mm. Hg was collected to afford Olivetol.

Example 32

A mixture of 2.14 g. (0.01 mole) of 2-chloro-5-n-pentyl-resorcinol and 5.6 g. (0.04 mole) of KOH in 50 ml. of methanol was heated in an autoclave with 2 g. of Pd/C at 50° and 100 p.s.i.g. for 5 hours. The catalyst was filtered, washed with three 20 ml. portions of ethanol and the filtrate was evaporated under reduced pressure to give Olivetol.

Example 33

A mixture of 3.9 (0.01 mole) of 3,5-dibromo-2,4-dihydroxy-6-n-pentylbenzoic acid methyl ester and 5.6 g. (0.04 mole) of KOH in 50 ml. of ethanol was hydrogenated in an autoclave with 2 g. of Pd/C at 50° and 100 p.s.i.g. for 5 hours. The catalyst was filtered, washed with three 20 ml. portions of ethanol and the combined filtrate was evaporated under reduced pressure to give Olivetol.

Example 34

Into a 2-liter three neck creased flask equipped with thermometer, stirrer, condenser and Hershberg dropping funnel was placed 100 ml. of 2.5 N sodium hydroxide and 348 g. (6 moles) of acetone. The mixture (under a nitrogen atmosphere) was heated to 54° with an oil bath and, while stirring rapidly, a solution of 200 g. of 2-methyl-1-octanal in 232 g. (4 moles) of acetone was added dropwise over a period of 3 hours. After completion of the addition, stirring was continued for an additional 30 minutes at 54°, the reaction mixture was cooled to 10°, and 83 ml. of 3 N hydrochloric acid was added to pH 4.5. Anhydrous magnesium sulfate (240 g.) was added with cooling, stirred 30 minutes and the mixture filtered. The filtrate was concentrated at reduced pressure to give a residual brown oil weighing 369.2 g., which was dissolved in 1 liter of benzene and further dried over anhydrous magnesium sulfate. After removal of the drying agent by filtration, 136.8 g. (0.856 mole) of anhydrous powdered cupric sulfate was added and the mixture was stirred and refluxed for 18 hours. During this reflux period about 20 ml. of water was azeotropically removed with a Dean-Stark assembly. On cooling to room temperature, the copper sulfate was removed by filtration and the presscake was washed with three 200 ml. portions of benzene. The combined benzene filtrates were concentrated at reduced pressure to give 322.5 g. of a residual brown oil which was distilled through a 9-inch Vigreux column. After separation, the product 5-methylundec-3-en-2-one was collected in two fractions: 125.7 g., b.p. 77–80°/6.5 mm. Hg and 25.2 g., b.p. 80–83°.

Example 35

A mixture of 100 g. of 3,5-dimethoxy-n-amylbenzene and 600 g. of pyridine hydrochloride in a 2 liter 3-neck flask equipped with mechanical stirrer is heated with a mantle and allowed to distill until the temperature of the vapors reach 210°. (Usually 5–10 ml. of distillate.) A reflux condenser is then added and the solution is heated under reflux for 90 minutes. The reaction is allowed to cool to below 100° and 1 liter of 2 N hydrochloric acid is added. The cooled solution is then extracted four times each time with 1 liter of ethyl acetate. The extracts were dried ($Na_2SO_4$), concentrated under vacuum and then distilled under high vacuum to give Olivetol, boiling point 165° (1 mm. Hg).

Example 36

A mixture of 3.6 g. (0.02 mole) of 3-methoxy-5-n-pentyl-2-cyclohexen-1-one and 6.8 g. 60.04 moles of cupric bromide in 100 ml. of benzyl alcohol was reacted by the procedure of Example 29 to produce 3-benzyloxy-5-methoxy-n-amylbenzene.

Example 37

100 g. of 3-benzyloxy-5-methoxy-n-amylbenzene was reacted in the manner of Example 35 to produce Olivetol.

We claim:
1. A compound of the formula

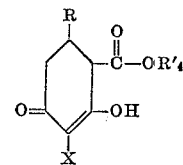

wherein $R'_4$ is hydrogen, lower alkyl or phenyl-lower alkyl; X is chlorine, bromine or iodine; and R is an alkyl group containing from 1 to 26 carbon atoms.

2. Methyl - 3 - bromo - 2 - hydroxy-4-oxo-6-n-pentyl-cyclohex-2-ene-1-carboxylate.

3. Methyl - 3 - bromo - 2 - hydroxy-4-ono-6-n-propyl-2-cyclohexene-1-carboxylate.

4. Methyl-3-bromo-2-hydroxy - 4 - oxo-6-n-heptyl - 2-cyclohexene-1-carboxylate.

5. Methyl - 2 - hydroxy - 3 - iodo-4-oxo-6-n-pentyl-2-cyclohexene-1-carboxylate.

6. Methyl-3-bromo - 2 - hydroxy - 4 - oxo-6-(1-methylheptyl)-2-cylohexene-1-carboxylate.

References Cited

Fort: J. Org. Chem. 26, 705 (1961).
Vorlander et al.; Ann., 322, 239 (1902).
Beilstein: Volume 10, 2nd addition, p. 288.

LORRAINE A. WEINBERGER, Primary Examiner
R. GERSTL, Assistant Examiner

U.S. Cl. X.R.

260—468 K, 473 S, 514 J, 514 K, 521 R, 521 A, 593 R, 594, 586 R, 613 D, 613 R, 625

UNITED STATES PATENT OFFICE
CERTIFICATE OF CORRECTION

PATENT NO. : 3,824,272
DATED : July 16, 1974
INVENTOR(S) : Arnold Brossi, Antonino Focella and Sidney Teitel It is certified that error appears in the above-identified patent and that said Letters Patent are hereby corrected as shown below:

Column 18, line 15

"Methyl-3-bromo-2-hydroxy-4-ono-6-n-propyl-2-"

Should be

Methyl-3-bromo-2-hydroxy-4-oxo-6-n-propyl-2-

Signed and Sealed this

Twenty-seventh Day of July 1976

[SEAL]

Attest:

RUTH C. MASON
*Attesting Officer*

C. MARSHALL DANN
*Commissioner of Patents and Trademarks*